United States Patent
Son et al.

(10) Patent No.: US 8,441,993 B2
(45) Date of Patent: May 14, 2013

(54) APPARATUS AND METHOD FOR RESUMPTION REQUEST OF EXTENDED REAL TIME POLLING SERVICE IN A BROADBAND WIRELESS COMMUNICATION SYSTEM

(75) Inventors: Yeong-Moon Son, Yongin-si (KR); Won-II Roh, Yongin-si (KR); Jae-Jeong Shim, Seongnam-si (KR); Geun-Hwi Lim, Seongnam-si (KR); Sung-Jin Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1121 days.

(21) Appl. No.: 12/357,162

(22) Filed: Jan. 21, 2009

(65) Prior Publication Data

US 2009/0190568 A1    Jul. 30, 2009

(30) Foreign Application Priority Data

Jan. 25, 2008  (KR) ........................ 10-2008-0008297

(51) Int. Cl.
*H04W 4/00* (2009.01)
(52) U.S. Cl.
USPC .......................................... 370/329; 370/346
(58) Field of Classification Search .................. 370/310, 370/322, 329, 341, 348, 436, 437, 346, 449
See application file for complete search history.

(56) References Cited

U.S. PATENT DOCUMENTS

| | | | |
|---|---|---|---|
| 7,817,597 B2 | 10/2010 | Usuda et al. | |
| 2006/0089104 A1 | 4/2006 | Kaikkonen et al. | |
| 2006/0245352 A1* | 11/2006 | Kang et al. | 370/329 |
| 2008/0130531 A1* | 6/2008 | Chou | 370/310 |
| 2008/0304445 A1* | 12/2008 | Chou | 370/329 |
| 2009/0010243 A1* | 1/2009 | Hiddink | 370/346 |
| 2009/0034464 A1* | 2/2009 | Baek et al. | 370/329 |
| 2009/0141677 A1* | 6/2009 | Maas | 370/329 |

FOREIGN PATENT DOCUMENTS

| | | |
|---|---|---|
| CN | 1063006 C | 3/2001 |
| CN | 1773886 A | 5/2006 |
| EP | 1 718 010 A2 | 11/2006 |
| EP | 1 821 479 A1 | 8/2007 |
| EP | 1821479 A1 | 8/2007 |
| WO | 03/088695 A1 | 10/2003 |
| WO | 2004/114549 A1 | 12/2004 |
| WO | 2006115391 A1 | 11/2006 |

OTHER PUBLICATIONS

Gerrit Hiddink et al., Confirmation of resuming periodic allocations after ertPS silence suppression, IEEE 802.16 Broadband Wireless Access Working Group, Nov. 4, 2007, pp. 1-3.

(Continued)

*Primary Examiner* — Jeffrey M Rutkowski
(74) *Attorney, Agent, or Firm* — Jefferson IP Law, LLP

(57) ABSTRACT

A method of operating a Base Station (BS) in a broadband wireless communication system to resume an extended real-time Polling Service (ertPS) is provided. The method of operating the BS includes detecting a codeword received through a Channel Quality Indicator (CQI) channel, and upon receiving a CQI CHannel (CQICH) codeword for requesting resumption of an extended real-time Polling Service (ertPS) connection from a Mobile Station (MS), allocating to the MS an uplink resource corresponding to the largest maximum sustainable traffic rate of at least one ertPS connec established to the MS.

26 Claims, 7 Drawing Sheets

OTHER PUBLICATIONS

Hyoung Kyu Lim et al., Refinement of the extended rtPS, IEEE 802.16 Broadband Wireless Access Working Group, May 3, 2005, pp. 1-3.

Yeongmoon Son et al., ertsPS resumption with single ertPS codeword on CQICH, IEEE 802.16 Broadband Wireless Access Working Group, Mar. 10, 2008, pp. 1-3.

* cited by examiner

APPARATUS AND METHOD FOR RESUMPTION REQUEST OF EXTENDED REAL TIME POLLING SERVICE IN A BROADBAND WIRELESS COMMUNICATION SYSTEM

PRIORITY

This application claims the benefit under 35 U.S.C. §119 (a) of a Korean patent application filed in the Korean Intellectual Property Office on Jan. 25, 2008 and assigned Serial No. 10-2008-0008297, the entire disclosure of which is hereby incorporated by reference.

BACKGROUND OF THE INVENTION

1. Field of the Invention

The present invention relates to a broadband wireless communication system. More particularly, the present invention relates to an apparatus and method for requesting resumption of an extended real-time Polling Service (ertPS) in a broadband wireless communication system.

2. Description of the Related Art

Available radio resources are limited in a wireless communication system. Thus, a scheduling scheme that effectively uses the limited radio resources is required. Effective scheduling includes certain requirements such as the reallocation of necessary services by rapidly recollecting unnecessarily allocated resources, the deceasing of an amount of information exchanged using radio resources, and the allowing of residual resources to be used for other usages.

The wireless communication system defines a scheduling scheme according to a service property and type in order to ensure Quality of Service (QoS). Examples of the scheduling scheme include an Unsolicited Grant Service (UGS), a real-time Polling Service (rtPS), an extended real-time Polling Service (ertPS), etc.

The ertPS is an uplink resource allocation scheme and has the following characteristics. Resources are persistently allocated to a connection employing the ertPS at the request of a Mobile Station (MS). Unless there is a change in a requested resource amount, the MS transmits traffic using the allocated resources without additional polling. In other words, the same resources are persistently allocated to the MS without additional polling for the ertPS connection. Therefore, if a data rate needs to be decreased or increased, the MS transmits control information to a Base Station (BS) in order to report the increase or decrease of the required resource.

In addition to the increase or decrease of the required resource, the MS can request a temporary stop of uplink resource allocation. For example, a system using Voice over Internet Protocol (VoIP) has a talk-spurt period and a silence period. During the silence period, there is no data to be transmitted. As such, in the silence period having no data to be transmitted, the MS requests a temporary stop of resource allocation for the ertPS connection.

The ertPS connection whose resource allocation is temporarily stopped can be resumed according to the following methods. In a first method, the MS transmits a Bandwidth Request Header (BRH) including required resource amount information. In a second method, through a Channel Quality Indicator (CQI) channel, the MS transmits a Channel Quality Indicator CHannel (CQICH) codeword indicating an ertPS connection resumption request. Accordingly, the BS receives the CQICH codeword for the ertPS connection resumption request and then allocates uplink resources according to a maximum sustainable traffic rate of the ertPS connection of the MS. In general, the overhead generated in the second method is less than that generated in the first method. Therefore, the second method is prevalently used. The CQI channel is designed for channel information feedback of the MS, but may also be used to transmit the CQICH codeword used for a special purpose such as the ertPS connection resumption request, etc. In this case, the CQICH codeword used for the special purpose is determined according to a system configuration.

If only one CQICH codeword exists for the ertPS connection resumption request, it is difficult for an MS having a plurality of ertPS connections to use the method employing the CQICH codeword when the ertPS connection resumption is requested. This is because the BS which receives the CQICH codeword for the ertPS connection resumption request cannot identify a connection requested to be resumed among the plurality of ertPS connections. Accordingly, for a case of an MS having a plurality of ertPS connections, there is a need for a method of identifying the plurality of connections when ertPS connection resumption is requested.

SUMMARY OF THE INVENTION

An aspect of the present invention is to address at least the above-mentioned problems and/or disadvantages and to provide at least the advantages described below. Accordingly, an aspect of the present invention is to provide an apparatus and method for identifying an extended real-time Polling Service (ertPS) connection which is requested to be resumed using a Channel Quality Indicator CHannel (CQICH) codeword in a broadband wireless communication system.

Another aspect of the present invention is to provide an apparatus and method for simultaneously requesting resumption of a plurality of ertPS connections in a broadband wireless communication system.

Yet another aspect of the present invention is to provide an apparatus and method for delivering a list of ertPS connections to be resumed using a bitmap in a broadband wireless communication system.

In accordance with an aspect of the present invention, a method of operating a Base Station (BS) in a wireless communication system is provided. The method includes detecting a codeword received through a Channel Quality Indicator (CQI) channel, and, upon receiving a CQICH codeword for requesting resumption of an ertPS connection from a Mobile Station (MS), allocating to the MS an uplink resource corresponding to the largest maximum sustainable traffic rate of at least one ertPS connection established to the MS.

In accordance with another aspect of the present invention, a method of operating an MS in a wireless communication system is provided. The method includes, if at least one of a plurality of stopped ertPS connections is intended to be resumed, transmitting a CQICH codeword for informing of the existence of pending ertPS data, generating at least one ertPS Media Access Control (MAC) Protocol Data Unit (PDU) including a Connection IDentifier (CID) of the at least one ertPS connection, and transmitting the at least one ertPS MAC PDU when an uplink resource is allocated upon transmission of the CQICH codeword.

In accordance with yet another aspect of the present invention, a BS apparatus in a wireless communication system is provided. The apparatus includes a CQI demodulator for detecting a codeword received through a CQI channel, and a controller for allocating to an MS an uplink resource corresponding to the largest maximum sustainable traffic rate of at least one ertPS connection established to the MS upon receiving a CQICH codeword for requesting resumption of the ertPS connection from the MS.

In accordance with still another aspect of the present invention, an MS apparatus in a wireless communication system is provided. The apparatus includes a transmitter for transmitting a CQICH codeword for informing of existence of pending ertPS data if at least one of a plurality of stopped ertPS connections is intended to be resumed, a data buffer for generating at least one ertPS MAC PDU including a CID of the at least one ertPS connection, and a controller for providing control so that the at least one ertPS MAC PDU is transmitted when an uplink resource is allocated upon transmission of the CQICH codeword.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, an exemplary technique for requesting resumption of an extended real-time Polling Service (ertPS) connection (or service flow) by using a Channel Quality Indicator CHannel (CQICH) codeword in a broadband wireless communication system will be described. Although a wireless communication system based on an Orthogonal Frequency Division Multiplexing (OFDM)/Orthogonal Frequency Division Multiple Access (OFDMA) scheme will be described below as an example, the present invention can also equally apply to other types of wireless communication systems.

Figure 1:
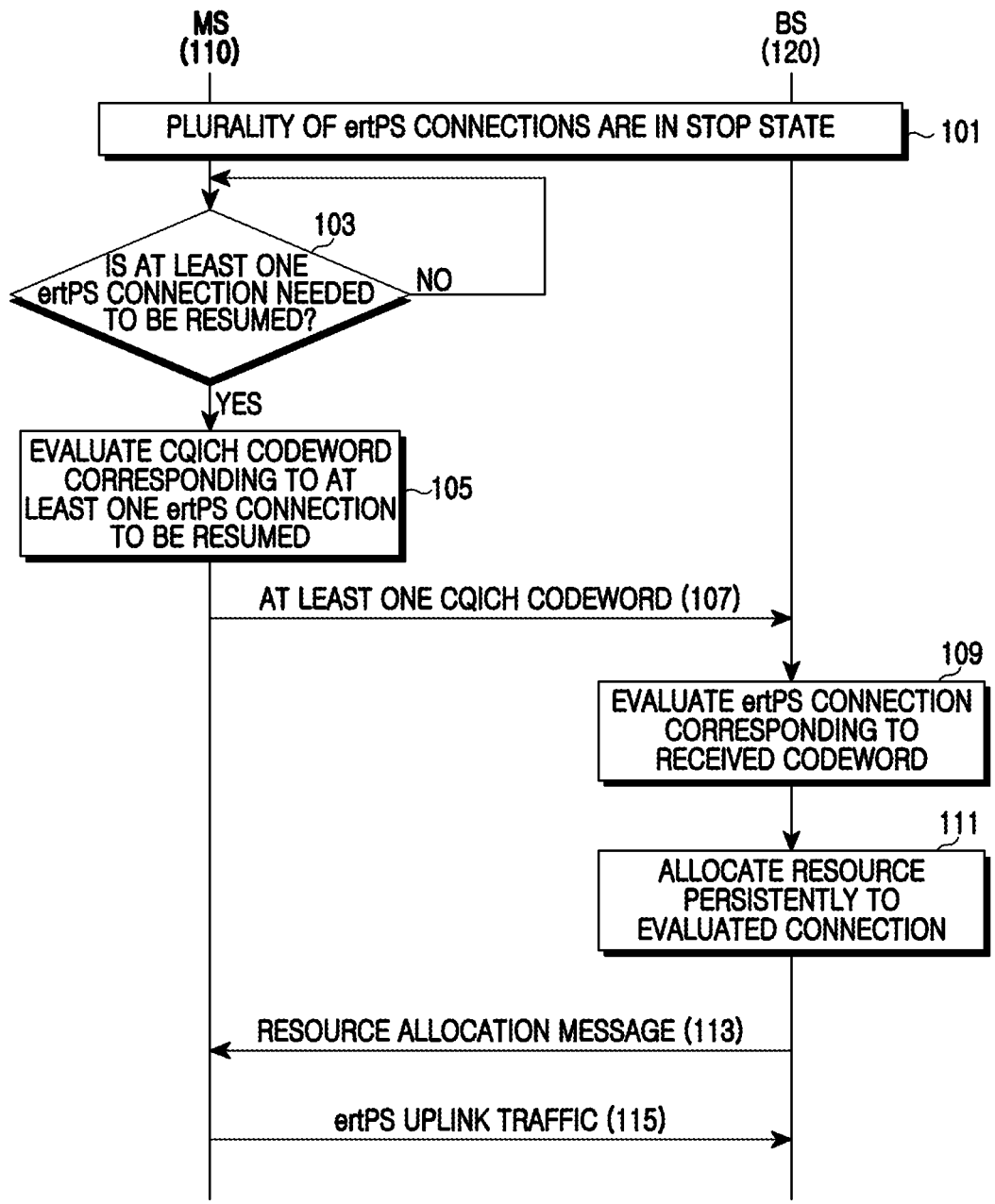
FIG. 1 is a flowchart illustrating a process of requesting resumption of an extended real-time Polling Service (ertPS) connection of a Mobile Station (MS) and a Base Station (BS) in a broadband wireless communication system according to an exemplary embodiment of the present invention.

FIG. 1 is a flowchart illustrating a process of requesting resumption of an ertPS connection of a Mobile Station (MS) 110 and a Base Station (BS) 120 in a broadband wireless communication system according to an exemplary embodiment of the present invention. In FIG. 1, it is assumed that there are a plurality of CQICH codewords for requesting resumption of the ertPS connection.

Referring to FIG. 1, the MS 110 and the BS 120 include a plurality of temporarily stopped ertPS connections in step 101.

Thereafter, the MS 110 determines whether there is a need to resume at least one connection among the plurality of stopped ertPS connections in step 103. For example, when using a Voice over Internet Protocol (VoIP) service, the MS 110 determines whether transition is made from a silence period to a talk-spurt period.

When the MS 110 determines that at least one ertPS connection needs to be resumed, the MS 110 evaluates a CQICH codeword corresponding to the at least one connection to be resumed in step 105. For example, the CQICH codeword is mapped with a Service Flow IDentifier (SFID) or a Connection IDentifier (CID). In a case where the CQICH codeword is mapped with the SFID in an ascending order, if SFIDs of three ertPS connections are 1, 3, and 7, the SFID 1 is mapped with the first CQICH codeword, the SFID 3 is mapped with the second CQICH, and the SFID 7 is mapped with the third CQICH codeword. In another exemplary implementation, the mapping order may be a descending order.

After evaluating the at least one CQICH codeword according to the aforementioned mapping relation, the MS 110 transmits the evaluated at least one CQICH codeword to the BS 120 through a CQI channel in step 107. If a plurality of CQICH codewords are transmitted in this case, the MS 110 sequentially transmits each of the plurality of CQICH codewords. In another exemplary implementation, the MS 110 concurrently transmits each of the plurality of CQICH codewords.

Upon receiving the at least one CQICH codeword, the BS 120 evaluates an ertPS connection corresponding to the received at least one CQICH codeword in step 109. For example, the BS 120 may evaluate the ertPS connection corresponding to the received at least one CQICH codeword by using a table which stores a mapping relation between the ertPS connection and the CQICH codeword.

After evaluating the ertPS connection corresponding to the at least one CQICH codeword, the BS 120 persistently allocates an uplink resource to the evaluated at least one ertPS connection in step 111. That is, the BS 120 resumes scheduling on the evaluated at least one ertPS connection. An amount of the uplink resource allocated to the at least one ertPS connection conforms to a maximum sustainable traffic rate of each ertPS connection.

Thereafter, the BS 120 transmits a resource allocation message including resource allocation information to the MS 110 in step 113.

Upon receiving the resource allocation message, the MS 110 evaluates the uplink resource allocated to the MS 110, and transmits uplink traffic of the resumed at least one ertPS connection by using the evaluated uplink resource in step 115.

Figure 2:
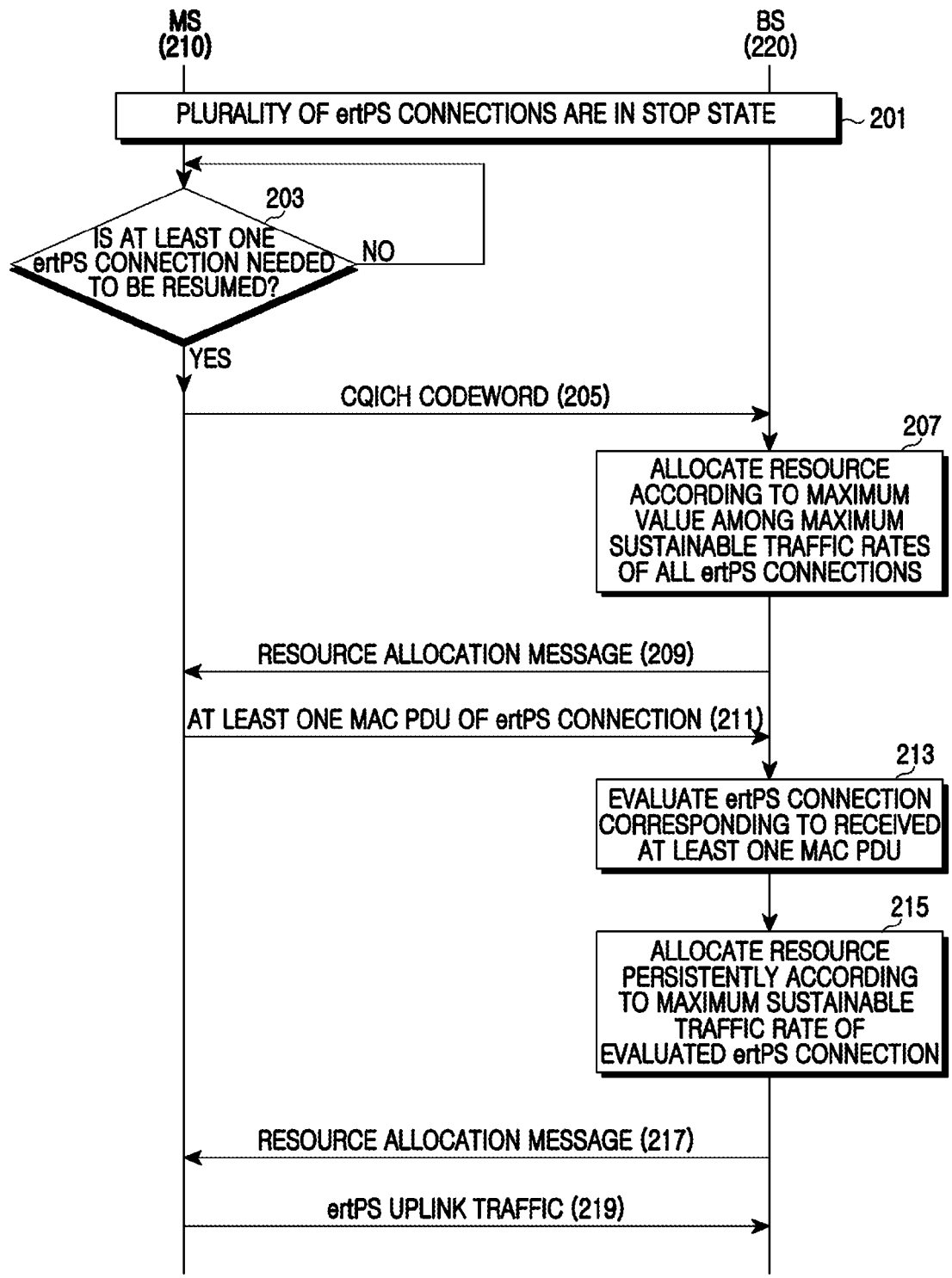
FIG. 2 is a flowchart illustrating a process of requesting resumption of an ertPS connection of an MS and a BS in a broadband wireless communication system according to an exemplary embodiment of the present invention.

FIG. 2 is a flowchart illustrating a process of requesting resumption of an ertPS connection of an MS 210 and a BS 220 in a broadband wireless communication system according to an exemplary embodiment of the present invention.

Referring to FIG. 2, the MS 210 and the BS 220 include a plurality of temporarily stopped ertPS connections in step 201.

Thereafter, the MS 210 determines whether there is a need to resume at least one connection among the plurality of stopped ertPS connections in step 203. For example, in case of an ertPS connection for a VoIP service, the MS 210 determines whether transition is made from a silence period to a talk-spurt period.

When the MS 210 determines that the at least one ertPS connection needs to be resumed, the MS 210 transmits a CQICH codeword for requesting ertPS connection resumption, that is, for informing of an existence of pending ertPS data to the BS 220 in step 205. The CQICH codeword for requesting the ertPS connection resumption is determined according to a system configuration, and is transmitted through a CQI channel.

Upon receiving the CQICH codeword, the BS 220 allocates an uplink resource to the MS 210 according to a maximum value among respective maximum sustainable traffic rates of all ertPS connections of the MS 210 in step 207. That is, the CQICH codeword does not indicate for which ertPS connection the resumption request is made. Therefore, the BS 220 allocates the uplink resource according to the maximum value so that the MS 210 can transmit a Media Access Control (MAC) Protocol Data Unit (PDU) of any ertPS connection. In another exemplary implementation, the BS 220 may allocate the uplink resource to the MS 210 according to the maximum value among the respective maximum sustainable traffic rates of temporarily stopped ertPS connections of the MS 210.

Thereafter, the BS 220 transmits a resource allocation message including resource allocation information to the MS 210 in step 209.

Upon receiving the resource allocation message, the MS 210 evaluates the uplink resource allocated to the MS 210, and then transmits to the BS 220 the MAC PDU of the resumed at least one ertPS connection by using the evaluated uplink resource in step 211. That is, the MS 210 can transmit only the MAC PDU of one ertPS connection, and can also transmit MAC PDUs of a plurality of ertPS connections within a range of an amount of the allocated uplink resource.

Upon receiving the MAC PDU of the at least one ertPS connection, the BS 220 evaluates an ertPS connection corresponding to the received MAC PDU in step 213. In other words, the BS 220 evaluates a CID included in the received MAC PDU so as to evaluate the ertPS connection corresponding to the MAC PDU. If the evaluated CID is not the CID of the ertPS connection, the BS 220 recognizes that the ertPS resumption request has been canceled.

After evaluating the ertPS connection corresponding to the received MAC PDU, the BS 220 persistently allocates an uplink resource to the evaluated at least one ertPS connection in step 215. That is, the BS 220 resumes scheduling on the evaluated at least one ertPS connection. An amount of the uplink resource allocated to the at least one ertPS connection conforms to a maximum sustainable traffic rate of each ertPS connection.

Thereafter, the BS 220 transmits a resource allocation message including resource allocation information to the MS 210 in step 217.

Upon receiving the resource allocation message, the MS 210 evaluates the uplink resource allocated to the MS 210, and transmits uplink traffic of the resumed at least one ertPS connection by using the evaluated uplink resource in step 219.

Figure 3:
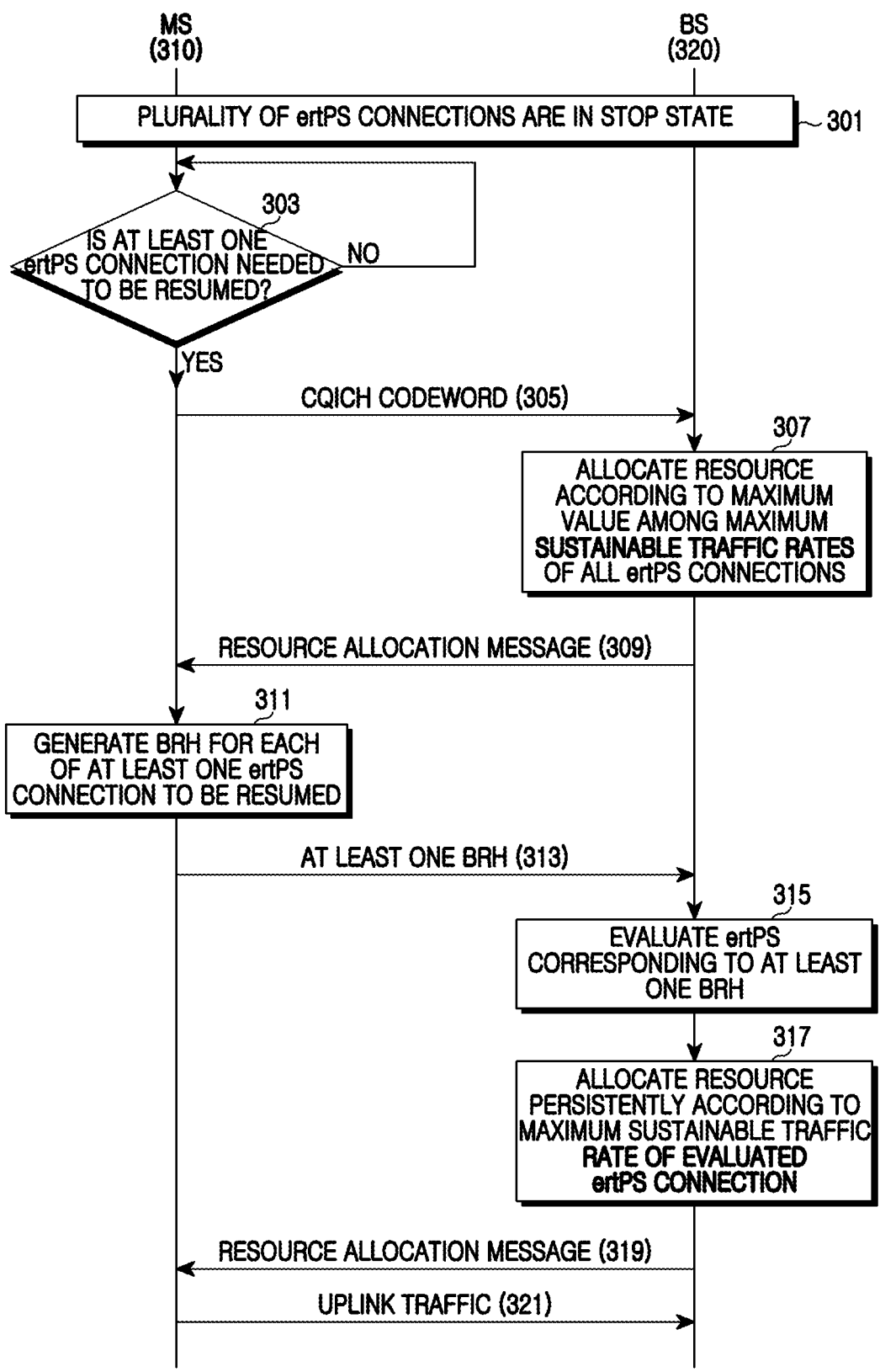
FIG. 3 is a flowchart illustrating a process of requesting resumption of an ertPS connection of an MS and a BS in a broadband wireless communication system according to an exemplary embodiment of the present invention.

FIG. 3 is a flowchart illustrating a process of requesting resumption of an ertPS connection of an MS 310 and a BS 320 in a broadband wireless communication system according to an exemplary embodiment of the present invention.

Referring to FIG. 3, the MS 310 and the BS 320 include a plurality of temporarily stopped ertPS connections in step 301.

Thereafter, the MS 310 determines whether there is a need to resume at least one connection among the plurality of stopped ertPS connections in step 303. For example, in case of an ertPS connection for a VoIP service, the MS 310 determines whether transition is made from a silence period to a talk-spurt period.

When the MS 310 determines that the at least one ertPS connection needs to be resumed, the MS 310 transmits a CQICH codeword for requesting ertPS connection resumption, that is, for informing of an existence of pending ertPS data to the BS 320 in step 305. The CQICH codeword is determined according to a system configuration, and is transmitted through a CQI channel.

Upon receiving the CQICH codeword, the BS 320 allocates an uplink resource to the MS 310 according to a maximum value among respective maximum sustainable traffic rates of all ertPS connections of the MS 310 in step 307. That is, the CQICH codeword does not include information indicating for which ertPS connection the resumption request is made. Therefore, the BS 320 allocates the uplink resource according to the maximum value so that the MS 310 can transmit a MAC PDU of any ertPS connection. In another exemplary implementation, the BS 320 may allocate the uplink resource to the MS 310 according to the maximum value among the respective maximum sustainable traffic rates of temporarily stopped ertPS connections selected from all ertPS connections of the MS 310.

After allocating the uplink resource, the BS 320 transmits a resource allocation message including resource allocation information to the MS 310 in step 309.

Thereafter, the MS 310 generates a Bandwidth Request Header (BRH) for each of at least one ertPS connection to be resumed in step 311. The BRH includes a header type, a request bandwidth size, a CID, etc. That is, the MS 310 generates at least one BRH including each CID of the at least one ertPS connection to be resumed.

After generating the at least one BRH, the MS 310 transmits the at least one BRH to the BS 320 in step 313.

Upon receiving the at least one BRH, the BS 320 evaluates an ertPS connection corresponding to the received at least one BRH in step 315. In other words, the BS 320 evaluates a CID included in the received at least one BRH so as to evaluate the at least one ertPS connection corresponding to the at least one BRH. If the evaluated CID is not the CID of the ertPS connection, the BS 320 recognizes that the ertPS resumption request has canceled.

After evaluating the ertPS connection corresponding to the received at least one BRH, the BS 320 persistently allocates an uplink resource to the evaluated at least one ertPS connection in step 317. That is, the BS 320 resumes scheduling on the evaluated at least one ertPS connection. An amount of the uplink resource allocated to the at least one ertPS connection conforms to a maximum sustainable traffic rate of each ertPS connection.

Thereafter, the BS 320 transmits a resource allocation message including resource allocation information to the MS 310 in step 319.

Upon receiving the resource allocation message, the MS 310 evaluates the uplink resource allocated to the MS 310, and transmits uplink traffic of the resumed at least one ertPS connection by using the evaluated uplink resource in step 321.

Figure 4:
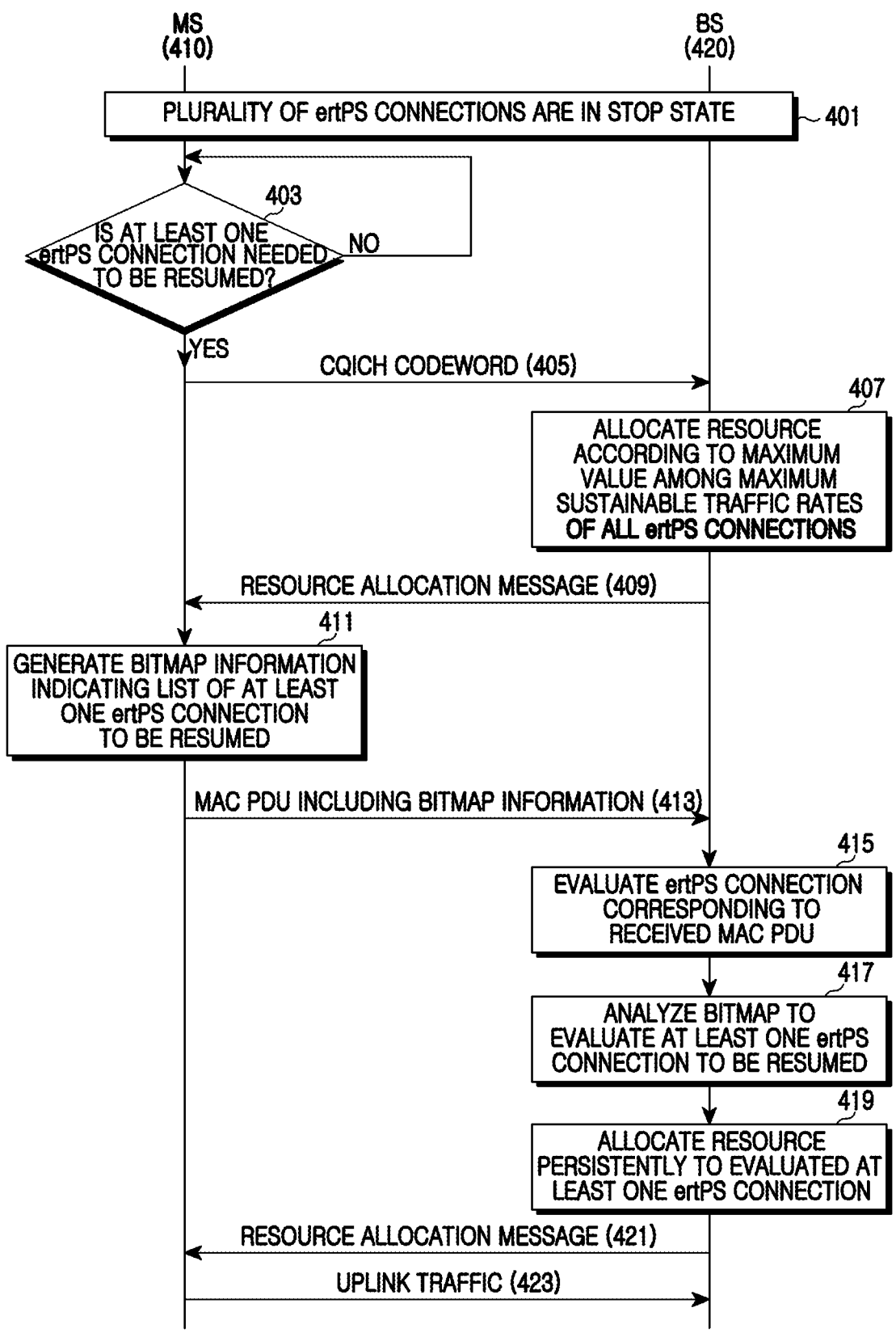
FIG. 4 is a flowchart illustrating a process of requesting resumption of an ertPS connection of an MS and a BS in a broadband wireless communication system according to an exemplary embodiment of the present invention.

FIG. 4 is a flowchart illustrating a process of requesting resumption of an ertPS connection of an MS 410 and a BS 420 in a broadband wireless communication system according to an exemplary embodiment of the present invention.

Referring to FIG. 4, the MS 410 and the BS 420 include a plurality of temporarily stopped ertPS connections in step 401.

Thereafter, the MS 410 determines whether there is a need to resume at least one connection among the plurality of stopped ertPS connections in step 403. For example, in case of an ertPS connection for a VoIP service, the MS 410 determines whether transition is made from a silence period to a talk-spurt period.

When the MS 410 recognizes that the at least one ertPS connection needs to be resumed, the MS 410 transmits a CQICH codeword for requesting ertPS connection resumption, that is, for informing of an existence of pending ertPS data to the BS 420 in step 405. The CQICH codeword is determined according to a system configuration, and is transmitted through a CQI channel.

Upon receiving the CQICH codeword, the BS 420 allocates an uplink resource to the MS 410 according to a maximum value among respective maximum sustainable traffic rates of all ertPS connections of the MS 410 in step 407. That is, the CQICH codeword does not include information indicating for which ertPS connection the resumption request is made. Therefore, the BS 420 allocates the uplink resource according to the maximum value so that the MS 410 can transmit a MAC PDU of any ertPS connection. In another exemplary implementation, the BS 420 may allocate the uplink resource to the MS 410 according to the maximum value among the respective maximum sustainable traffic rates of temporarily stopped ertPS connections of the MS 410.

After allocating the uplink resource, the BS 420 transmits a resource allocation message including resource allocation information to the MS 410 in step 409.

Thereafter, the MS 420 generates a bitmap indicating a list of at least one ertPS connection to be resumed in step 411. For example, if a maximum possible number of ertPS connections of the MS 410 is '8', the bitmap is defined as described in Table 1 below.

TABLE 1

| Name | Size(bit) | Description |
| --- | --- | --- |
| ertPS connection service Resume bitmap | 8 bits | each bit is mapped to an ertPS connection based on SFID in ascending order |

If the maximum possible number of ertPS connections of the MS 410 is N, a size of the bitmap is at least N.

All bits of the bitmap are one-to-one mapped to SFIDs of the ertPS connections which the MS 410 has. For example, when the bits of the bitmap are mapped with the SFIDs in an ascending order, if SFIDs of three ertPS connections are 1, 3, and 7, the SFID 1 is mapped to a Most Significant Bit (MSB), the SFID 3 is mapped to a second bit, and the SFID 7 is mapped to a third bit. Alternatively, each bit of the bitmap is one-to-one mapped to CIDs of the ertPS connections established to the MS 410. For example, if CIDs of three ertPS connections are 100, 200, and 300, the CID 100 is mapped to the MSB of the bitmap, the CID 200 is mapped to the second bit of the bitmap, and the CID 300 is mapped to the third bit of the bitmap. In another exemplary implementation, the mapping order may be a descending order. In other words, bits constituting the bitmap indicate a request for resumption or no-request for resumption of respective ertPS connections, and the bits are sorted according to an ascending order or a descending order.

Upon generating the bitmap, the MS 410 transmits an MAC PDU including the bitmap to the BS 420 in step 413. The bitmap is included in an extended subheader, and the extended subheader is included in the MAC PDU. A MAC header of the MAC PDU includes one CID of at least one ertPS connection to be resumed.

Upon receiving the bitmap, the BS 420 evaluates an ertPS connection corresponding to the received MAC PDU in step 415. In other words, the BS 420 evaluates a CID included in the MAC header of the received MAC PDU so as to evaluate the ertPS connection corresponding to the MAC PDU.

Subsequently, the BS 420 analyzes the bitmap included in the MAC PDU so as to evaluate at least one ertPS connection to be resumed in step 417. The bitmap exists in the extended subheader included in the MAC PDU. That is, the BS 420 recognizes that the extended subheader exists in the MAC PDU, and evaluates at least one ertPS connection to be resumed by using the bitmap in the extended subheader.

After evaluating the at least one ertPS connection to be resumed by using the MAC header and the bitmap, the BS 420 persistently allocates an uplink resource to the evaluated at least one ertPS connection in step 419. That is, the BS 420 resumes scheduling on the evaluated at least one ertPS connection. An amount of the uplink resource allocated to the at least one ertPS connection conforms to a maximum sustainable traffic rate of each ertPS connection.

Thereafter, the BS 420 transmits a resource allocation message including resource allocation information to the MS 410 in step 421.

Upon receiving the resource allocation message, the MS 410 evaluates the uplink resource allocated to the MS 410, and transmits uplink traffic of the resumed at least one ertPS connection by using the evaluated uplink resource in step 423.

The process of requesting the ertPS connection has been described above with reference to FIG. 4 according to an exemplary embodiment of the present invention. If the number of the ertPS connections to be resumed is '1', the MS 410 may operate according to the exemplary embodiment of the present invention illustrated in FIG. 2 instead of generating the bitmap. That is, according to the number of ertPS connections to be resumed, the MS 410 can operate by selecting either the exemplary embodiment illustrated in FIG. 2 the exemplary embodiment illustrated in FIG. 4. In this case, since a MAC PDU transmitted by the MS 410 may not be included in the bitmap, the BS 420 has to determine whether the bitmap is included or not.

Figure 5:
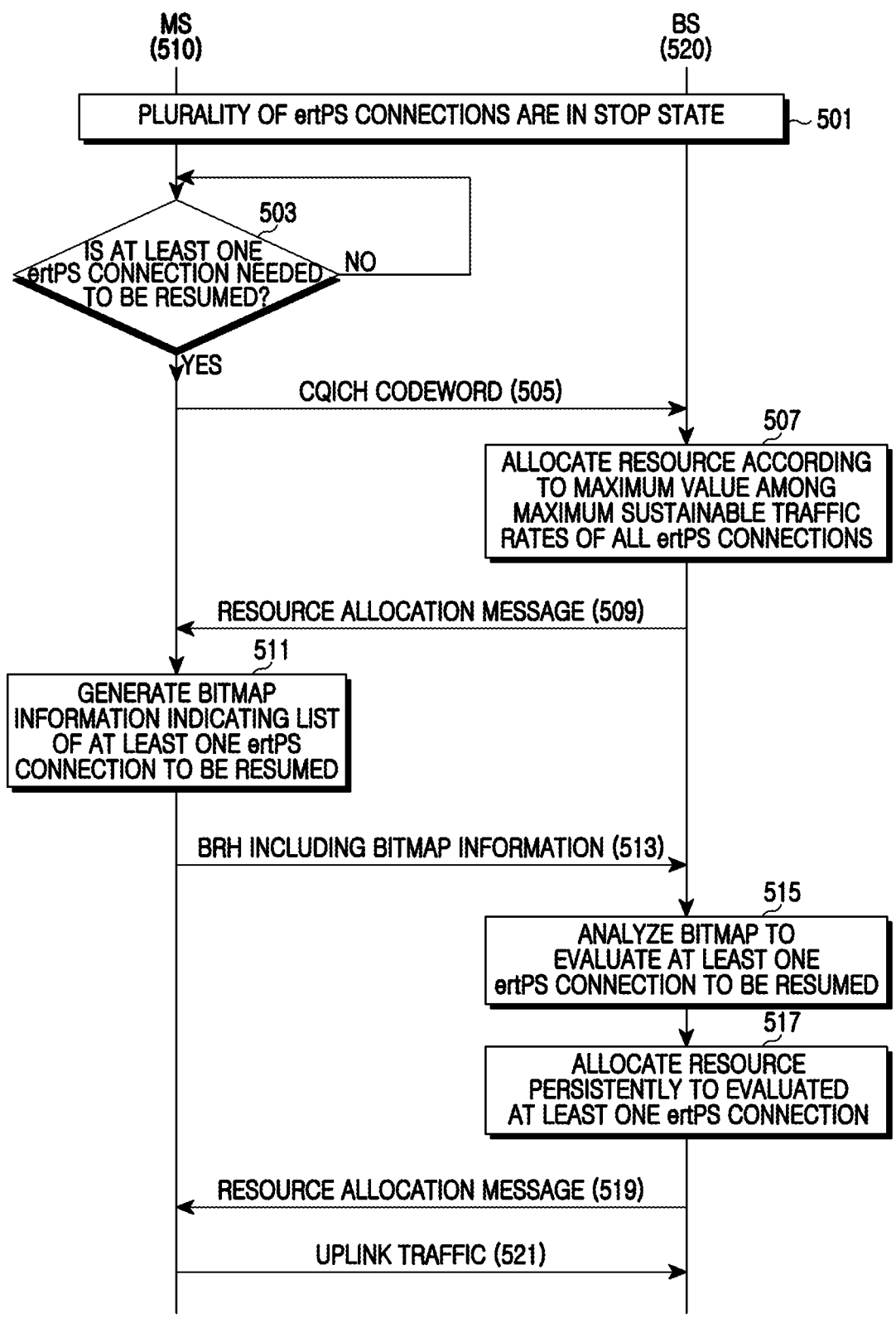
FIG. 5 is a flowchart illustrating a process of requesting resumption of an ertPS connection of an MS and a BS in a broadband wireless communication system according to an exemplary embodiment of the present invention.

FIG. 5 is a flowchart illustrating a process of requesting resumption of an ertPS connection of an MS 510 and a BS 520 in a broadband wireless communication system according to an exemplary embodiment of the present invention.

Referring to FIG. 5, the MS 510 and the BS 520 include a plurality of temporarily stopped ertPS connections in step 501.

Thereafter, the MS 510 determines whether there is a need to resume at least one connection among the plurality of stopped ertPS connections in step 503. For example, in case of an ertPS connection for a VoIP service, the MS 510 determines whether transition is made from a silence period to a talk-spurt period.

When the MS 510 recognizes that the at least one ertPS connection needs to be resumed, the MS 510 transmits a CQICH codeword for requesting ertPS connection resumption, that is, for informing of an existence of pending ertPS data to the BS 520 in step 505. The CQICH codeword is determined according to a system configuration, and is transmitted through a CQI channel.

Upon receiving the CQICH codeword, the BS 520 allocates an uplink resource to the MS 510 according to a maximum value among respective maximum sustainable traffic rates of all ertPS connections of the MS 510 in step 507. The CQICH codeword does not include information indicating for which ertPS connection the resumption request is made. Therefore, the BS 520 allocates the uplink resource according to the maximum value so that the MS 510 can transmit a MAC PDU of any ertPS connection. In another exemplary implementation, the BS 520 can allocate the uplink resource to the MS 510 according to the maximum value among the respective maximum sustainable traffic rates of temporarily stopped ertPS connections selected from all ertPS connections of the MS 510.

After allocating the uplink resource, the BS 520 transmits a resource allocation message including resource allocation information to the MS 510 in step 509.

Thereafter, the MS 420 generates a bitmap indicating a list of at least one ertPS connection to be resumed in step 511. If the maximum possible number of ertPS connections of the MS 510 is N, a size of the bitmap is at least N.

All bits of the bitmap are one-to-one mapped to SFIDs of the ertPS connections established to the MS 510. For example, when the bits of the bitmap are mapped with the SFIDs in an ascending order, if SFIDs of three ertPS connections are 1, 3, and 7, the SFID 1 is mapped to an MSB, the SFID 3 is mapped to a second bit, and the SFID 7 is mapped to a third bit. Alternatively, each bit of the bitmap is one-to-one mapped to CIDs of the ertPS connections established to the MS 510. For example, if CIDs of three ertPS connections are 100, 200, and 300, the CID 100 is mapped to the MSB of the bitmap, the CID 200 is mapped to the second bit of the bitmap, and the CID 300 is mapped to the third bit of the bitmap. In another exemplary implementation, the mapping order may be in a descending order. In other words, bits constituting the bitmap indicate a request for resumption or no-request for resumption of respective ertPS connections, and the bits are sorted according to an ascending order or a descending order.

Upon generating the bitmap, the MS 510 transmits a BRH including the bitmap to the BS 520 in step 513. The BRH has a structure as shown in Table 2 below.

TABLE 2

| HT = 1 (1) | EC = 1 (1) | Type (1) | Header Content MSB(13) |
|---|---|---|---|
| | | | Header Content(16) |
| Header Content LSB(8) | | | HCS(8) |

In the BRH of Table 2 above, the bitmap is included in a 'Header Content' field.

Upon receiving the BRH including the bitmap, the BS 520 analyzes the bitmap so as to evaluate at least one ertPS connection to be resumed in step 515.

After evaluating the at least one ertPS connection to be resumed by using the MAC header and the bitmap, the BS 520 persistently allocates an uplink resource to the evaluated at least one ertPS connection in step 517. That is, the BS 520 resumes scheduling on the evaluated at least one ertPS connection. An amount of the uplink resource allocated to the at least one ertPS connection conforms to a maximum sustainable traffic rate of each ertPS connection.

Thereafter, the BS 520 transmits a resource allocation message including resource allocation information to the MS 510 in step 519.

Upon receiving the resource allocation message, the MS 510 evaluates the uplink resource allocated to the MS 510, and transmits uplink traffic of the resumed at least one ertPS connection by using the evaluated uplink resource in step 521.

Figure 6:
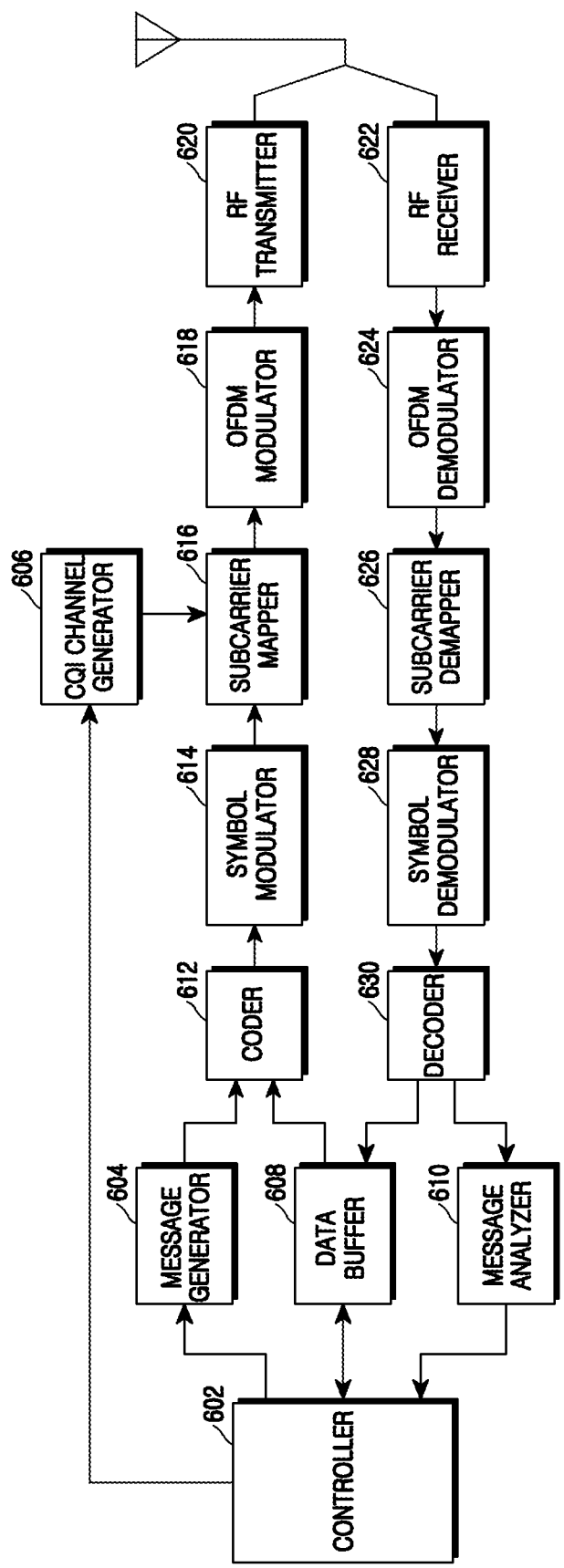
FIG. 6 is a block diagram illustrating a structure of an MS in a broadband wireless communication system according to an exemplary embodiment of the present invention.

FIG. 6 is a block diagram illustrating a structure of an MS in a broadband wireless communication system according to an exemplary embodiment of the present invention.

Referring to FIG. 6, the MS includes a controller 602, a message generator 604, a CQI channel generator 606, a data buffer 608, a message analyzer 610, a coder 612, a symbol modulator 614, a subcarrier mapper 616, an OFDM modulator 618, a Radio Frequency (RF) transmitter 620, an RF receiver 622, an OFDM demodulator 624, a subcarrier demapper 626, a symbol demodulator 628, and a decoder 630.

The controller 602 provides control to the MS. The message generator 604 generates a signaling message (e.g., a MAC management message) under the control of the controller 602, and provides the generated signaling message to the coder 612. The data buffer 608 buffers a Transmit (Tx) packet (e.g., MAC PDU) for each connection and provides the buffered Tx packet to the coder 612 under the control of the controller 602.

The coder 612 codes packets provided from the message generator 604 and the data buffer 608 according to a Modulation and Coding Scheme (MCS) level. The symbol modulator 614 modulates data provided from the coder 612 according to the MCS level. The CQI channel generator 606 generates a corresponding CQICH codeword under the control of the controller 602. In particular, when resumption of an ertPS connection is requested, the CQI channel generator 606 generates the CQICH codeword designated for the resumption request of the ertPS connection. A CQI channel can be used for downlink channel information and for special purposes (i.e., Fast Base Station Switching (FBSS), ertPS, etc.).

The subcarrier mapper 616 maps data provided from the symbol modulator 614 and the CQI channel generator 606 to subcarriers. The OFDM modulator 618 converts the data mapped to the subcarriers into time-domain sample data by performing an Inverse Fast Fourier Transform (IFFT) operation, and configures an OFDM symbol by adding a Cyclic Prefix (CP) to the sample data. The RF transmitter 620 converts the OFDM symbol provided from the OFDM modulator 618 into an analog signal, up-converts the analog signal to an RF signal, and transmits the RF signal through an antenna.

The RF receiver 622 converts the RF signal received through the antenna into a baseband signal, and converts the baseband signal into sample data. The OFDM demodulator 624 converts the sample data provided from the RF receiver 622 into frequency-domain data by performing a Fast Fourier Transform (FFT) operation. The subcarrier demapper 626 classifies the frequency domain data in an MCS level unit.

The symbol demodulator 628 demodulates burst data provided from the subcarrier demapper 626 according to the MCS level. The decoder 630 decodes the data provided from the symbol demodulator 628 according to the MCS level. Among data provided from the decoder 630, a packet for traffic is provided to the data buffer 608, and a packet for signaling is provided to the message analyzer 610. The message analyzer 610 analyzes a signaling message provided from the decoder 630 to evaluate context of the message, and provides the context to the controller 602.

According to the configuration of FIG. 6, an operation of the MS will be described when an ertPS connection is resumed.

According to the exemplary embodiment of the present invention illustrated in FIG. 1, the controller 602 manages at least one ertPS connection currently configured by performing one-to-one mapping of the ertPS connection onto an ertPS CQICH codeword. When a service of any ertPS connection is resumed, the controller 602 evaluates the ertPS CQICH codeword of the ertPS connection whose service will be resumed, and reports the evaluated codeword to the CQI channel generator 606. In this case, when services of a plurality of ertPS connections are concurrently resumed, the controller 602 reports codewords for the plurality of ertPS connections to the CQI channel generator 606. Then, the CQI channel generator 606 generates a corresponding CQICH codeword under the control of the controller 602, and provides the generated CQICH codeword to the subcarrier mapper 616. The CQICH codeword provided to the subcarrier mapper 616 is transmitted to the BS through a CQI channel allocated to the MS. If the services of the plurality of ertPS connections are concurrently resumed, the CQI channel generator 606 sequentially generates a plurality of CQICH codewords with respect to the resumed plurality of ertPS connections under the control of the controller 602. That is, the CQICH codewords are sequentially transmitted to the BS in every CQI feedback period.

According to the exemplary embodiment of the present invention illustrated in FIG. 2, when a service of any ertPS connection is resumed, the CQI channel generator 606 generates a CQICH codeword for resumption request, that is, for informing of an existence of pending ertPS data under the control of the controller 602. The generated CQICH codeword is transmitted to the BS through the CQI channel allocated to the MS. After transmitting the CQICH codeword to the BS, the controller 602 determines whether an uplink resource is allocated to the BS. When the uplink resource is allocated, the controller 602 instructs transmission of a MAC PDU of an ertPS connection to be resumed. In this case, if services of a plurality of ertPS connections are concurrently resumed, the controller 602 instructs transmission of MAC PDUs of the plurality of ertPS connections. That is, the data buffer 608 provides MAC PDUs of at least one ertPS connection to a physical layer processor under the control of the controller 602. Thereafter, the ertPS MAC PDUs are encoded and transmitted to the BS by using the allocated uplink resource.

According to the exemplary embodiment of the present invention illustrated in FIG. 3, after receiving the CQICH codeword for resumption request, that is, for informing of an existence of pending ertPS data, if the uplink resource is allocated, the controller 602 instructs to create a BRH for the ertPS connection to be resumed. In this case, if services of a plurality of ertPS connections are concurrently resumed, the controller 602 instructs to create the BRH for the plurality of ertPS connections. That is, the message generator 604 creates at least one BRH under the control of the controller 602 and provides the created BRH to the physical layer processor. Thereafter, the at least one BRH is physical-layer encoded and is then transmitted to the BS by using the allocated uplink resource.

According to the exemplary embodiment of the present invention illustrated in FIG. 4, after receiving the CQICH codeword for resumption request, that is, for informing of an existence of pending ertPS data, if the uplink resource is allocated, the controller 602 instructs to transmit a MAC PDU of the ertPS connection to be resumed. In this case, if services of a plurality of ertPS connections are concurrently resumed, the controller 602 instructs to create an extended subheader so that ertPS connections to be resumed are indicated. Then, the message generator 604 generates the extended subheader including a bitmap that indicates the ertPS connections to be resumed. Thereafter, the extended subheader is appended to a Tx ertPS MAC PDU and is then provided to the physical layer processor. In this case, a position of a bitmap corresponding to a CID of the ertPS MAC PDU can be basically set to '1'. However, since the BS can obtain the CID by using the ertPS MAC PDU, the position of the bitmap corresponding to the CID of the ertPS MAC PDU can be set to '0' in another exemplary embodiment.

According to the exemplary embodiment of the present invention illustrated in FIG. 5, after receiving the CQICH codeword for resumption request, that is, for informing of an existence of pending ertPS data, if the uplink resource is allocated, the controller 602 instructs to transmit a MAC PDU of the ertPS connection to be resumed. In this case, if services of a plurality of ertPS connections are concurrently resumed, the controller 602 instructs to create a BRH so that ertPS connections to be resumed are indicated. Then, the message generator 604 generates the BRH including a bitmap that indicates the ertPS connections to be resumed. Thereafter, the extended subheader is appended to a Tx ertPS MAC PDU and is then provided to the physical layer processor. In this case, a position of a bitmap corresponding to a CID of the ertPS MAC PDU can be basically set to '1'. However, since the BS can obtain the CID by using the ertPS MAC PDU, the position of the bitmap corresponding to the CID of the ertPS MAC PDU can be set to '0' in another exemplary embodiment.

Figure 7:
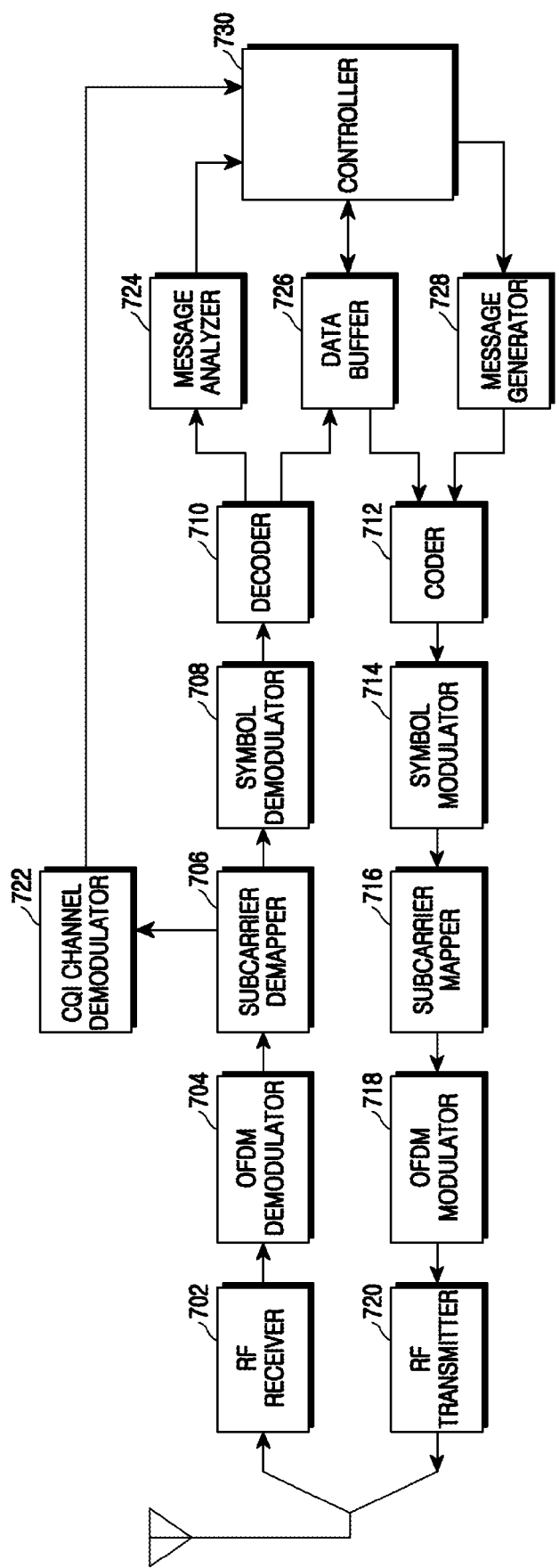
FIG. 7 is a block diagram illustrating a structure of a BS in a broadband wireless communication system according to an exemplary embodiment of the present invention.

FIG. 7 is a block diagram illustrating a structure of a BS in a broadband wireless communication system according to an exemplary embodiment of the present invention.

Referring to FIG. 7, the BS includes an RF receiver 702, an OFDM demodulator 704, a subcarrier demapper 706, a symbol demodulator 708, a decoder 710, a coder 712, a symbol modulator 714, a subcarrier mapper 716, an OFDM modulator 718, an RF transmitter 720, a CQI channel demodulator 722, a message analyzer 724, a data buffer 726, a message generator 728, and a controller 730.

The RF receiver 702 down-converts the RF signal received through an antenna into a baseband signal, and converts the baseband signal into sample data. The OFDM demodulator 704 converts the baseband sample data provided from the RF receiver 702 into frequency-domain data by performing an FFT operation. The subcarrier demapper 706 classifies the frequency-domain data in an MCS level unit, and provides the classified data to the symbol demodulator 708. Further, the subcarrier demapper 706 extracts data of a CQI channel from the frequency-domain data and provides the extracted data to the CQI channel demodulator 722.

The CQI channel demodulator 722 demodulates data provided from the subcarrier demapper 706 to detect a codeword received through each CQI channel, and provides information (e.g., CQI information) corresponding to the detected codeword to the controller 730. The symbol demodulator 708 demodulates burst data provided from the subcarrier demapper 706 according to an MCS level. The decoder 710 decodes data provided from the symbol demodulator 708 according to a certain scheme. Among data provided from the decoder 710, a packet for traffic is provided to the data buffer 726, and a packet for signaling is provided to the message analyzer 724.

The message analyzer 724 analyzes a signaling message provided from the decoder 710 to evaluate the context of the message, and provides the context to the controller 730. It is assumed that the controller 730 provides overall control to the BS and performs resource scheduling. The message generator 728 generates a signaling message (e.g., MAC management message) under the control of the controller 730, and provides the signaling message to the coder 712. The data buffer 726 buffers a Tx packet (e.g., MAC PDU) for each connection, and provides the buffered Tx packet to the coder 712 under the control of the controller 730. The coder 712 codes packets provided from the message generator 728 and the data buffer 726 according to the MCS level. The symbol modulator 714 modulates data provided from the coder 712 according to the MCS level.

The subcarrier mapper 716 maps data provided from the symbol modulator 714 to subcarriers. The OFDM modulator 718 converts data provided from the subcarrier mapper 716 into sample data by performing an IFFT operation, and configures an OFDM symbol by appending a CP to the sample data. The RF transmitter 720 converts the OFDM symbol provided from the OFDM modulator 718 into an analog signal, up-converts the analog signal into an RF signal, and transmits the RF signal through an antenna.

According to the configuration of FIG. 7, an operation of the BS will be described when an ertPS connection is resumed.

According to the exemplary embodiment of the present invention illustrated in FIG. 1, the CQI channel demodulator 722 detects a CQICH codeword received from each MS and provides the detected CQICH codeword to the controller 730. The controller 730 examines the detected CQICH codeword to determine whether resumption of an ertPS connection is requested from any MS. If the resumption is requested, the controller 730 determines an order of the detected CQICH codeword among a plurality of ertPS connection CQICH codewords. According to the determined order, the controller 730 selects a connection (i.e., an ertPS connection) which is requested to be resumed. The controller 730 allocates an uplink resource to the MS according to a maximum sustainable traffic rate of the selected ertPS connection.

According to the exemplary embodiment of the present invention illustrated in FIG. 2, upon receiving a CQICH codeword for requesting resumption of an ertPS connection from the MS, the controller 730 allocates an uplink resource according to a maximum sustainable traffic rate among at least one or more ertPS connections currently established to the MS. In another exemplary embodiment, the uplink resource may be allocated according to the maximum sustainable traffic rate among ertPS connections whose services are currently stopped. Thereafter, the message generator 728 analyzes an ertPS MAC PDU received using the allocated uplink resource and then provides the ertPS MAC PDU to the controller 730. In this case, upon receiving MAC PDUs for a plurality of ertPS connections, the controller 730 allocates the uplink resource to the MS according to the maximum sustainable traffic rate for each ertPS connection.

According to the exemplary embodiment of the present invention illustrated in FIG. 3, upon receiving a CQICH codeword for requesting resumption of an ertPS connection from the MS, the controller 730 allocates an uplink resource according to a maximum sustainable traffic rate among at least one or more ertPS connections currently established to the MS. In another exemplary embodiment, the uplink resource can be allocated according to the maximum sustainable traffic rate among ertPS connections whose services are currently stopped. Thereafter, the message generator 728 analyzes a BRH received using the allocated uplink resource and then provides the BRH to the controller 730. In this case, upon receiving a BRH for a plurality of ertPS connections, the controller 730 allocates the uplink resource to the MS according to the maximum sustainable traffic rate for each ertPS connection.

According to the exemplary embodiment of the present invention illustrated in FIG. 4, upon receiving a CQICH codeword for requesting resumption of an ertPS connection from the MS, the controller 730 allocates an uplink resource according to a maximum sustainable traffic rate among at least one or more ertPS connections currently established to the MS. In another exemplary embodiment, the uplink resource can be allocated according to the maximum sustainable traffic rate among ertPS connections whose services are currently stopped. Thereafter, the message generator 728 analyzes an ertPS MAC PDU received using the allocated uplink resource and then provides the ertPS MAC PDU to the controller 730. In this case, if the ertPS MAC PDU includes an extended subheader, the message generator 728 extracts a bitmap indicating ertPS connections to be resumed from the extended subheader and provides the bitmap to the controller 730. As such, upon receiving the ertPS MAC PDU including the extended subheader, the controller 730 determines ertPS connections to be resumed according to the bitmap, and allocates an uplink resource to the MS according to a maximum sustainable traffic rate for each ertPS connection.

According to the exemplary embodiment of the present invention illustrated in FIG. 5, upon receiving a CQICH codeword for requesting resumption of an ertPS connection from the MS, the controller 730 allocates an uplink resource according to a maximum sustainable traffic rate among at least one or more ertPS connections currently established to the MS. In another exemplary embodiment, the uplink resource can be allocated according to the maximum sustainable traffic rate among ertPS connections whose services are currently stopped. Thereafter, the message generator 728 analyzes an ertPS MAC PDU received using the allocated uplink resource and then provides the ertPS MAC PDU to the controller 730. In this case, if the ertPS MAC PDU includes a BRH, the message generator 728 extracts a bitmap indicating ertPS connections to be resumed from the BRH, and provides the bitmap to the controller 730. As such, upon receiving the ertPS MAC PDU including the BRH, the controller 730 determines ertPS connections to be resumed according to the bitmap, and allocates uplink resource to the MS according to the maximum sustainable traffic rate for each ertPS connection.

According to exemplary embodiments of the present invention, an uplink resource is allocated based on a maximum sustainable traffic rate when a BS receives a CQICH codeword for requesting resumption of an ertPS service connection in a broadband wireless communication system. Therefore, an MS having a plurality of stopped ertPS connections can request an ertPS connection resumption by using the CQICH codeword. In addition, a list of the plurality of ertPS connections can be delivered using a bitmap, and thus the MS can request concurrent resumption of the plurality of ertPS connections.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of operating a Base Station (BS) in a wireless communication system, the method comprising:
    receiving a Channel Quality Indicator (CQI) CHannel (CQICH) codeword for requesting resumption of an extended real-time Polling Service (ertPS) connection from a Mobile Station (MS); and
    allocating to the MS an uplink resource corresponding to the largest one among maximum sustainable traffic rates of a plurality of ertPS connections established to the MS.

2. The method of claim 1, wherein the allocating to the MS of the uplink resource corresponding to the maximum sustainable traffic rate comprises allocating to the MS the uplink resource corresponding to the maximum sustainable traffic rate among maximum sustainable traffic rates of at least one stopped ertPS connection established to the MS.

3. The method of claim 1, further comprising:
    receiving an ertPS Media Access Control (MAC) Protocol Data Unit (PDU) by using the uplink resource; and
    resuming scheduling on an ertPS connection corresponding to the ertPS MAC PDU.

4. The method of claim 1, further comprising:
    receiving an extended subheader including a bitmap indicating at least one ertPS connections to be resumed;
    identifying the at least one ertPS connection to be resumed by using the bitmap included in the extended subheader; and
    allocating an uplink resource for the at least one ertPS connection identified using the extended subheader.

5. A method of operating a Mobile Station (MS) in a wireless communication system, the method comprising:
    if at least one of a plurality of stopped extended real-time Polling Service (ertPS) connections is intended to be resumed, transmitting a Channel Quality Indicator CHannel (CQICH) codeword for informing of existence of pending ertPS data;
    generating at least one ertPS Media Access Control (MAC) Protocol Data Unit (PDU) of the at least one ertPS connection; and
    transmitting the at least one ertPS MAC PDU when an uplink resource is allocated upon transmission of the CQICH codeword,
    wherein the uplink resource corresponds to largest one among maximum sustainable traffic rates of a plurality of ertPS connections established to the MS.

6. The method of claim 5, wherein the ertPS MAC PDU comprises an extended subheader including a bitmap indicating the at least one ertPS connection to resume.

7. A Base Station (BS) apparatus in a wireless communication system, the apparatus comprising:
    a receiver for receiving a Channel Quality Indicator (CQI) CHannel (CQICH) codeword for requesting resumption of an extended real-time Polling Service (ertPS) connection from a Mobile Station (MS); and
    a controller for allocating to the MS an uplink resource corresponding to the largest one among maximum sustainable traffic rates of a plurality of ertPS connections established to the MS.

8. The apparatus of claim 7, wherein the controller allocates to the MS the uplink resource corresponding to the maximum sustainable traffic rate among maximum sustainable traffic rates of at least one stopped ertPS connection established to the MS.

9. The apparatus of claim 7, wherein the receiver receives an ertPS Media Access Control (MAC) Protocol Data Unit (PDU) by using the uplink resource,
    wherein the controller resumes scheduling on an ertPS connection corresponding to the ertPS MAC PDU.

10. The apparatus of claim 7, wherein the receiver receives an extended subheader including a bitmap indicating at least one ertPS connection to be resumed is included in the ertPS MAC PDU,
    wherein the controller identifies the at least one ertPS connection to be resumed by using the bitmap included in the extended subheader, and allocates an uplink resource for the at least one ertPS connection identified using the extended subheader.

11. A Mobile Station (MS) apparatus in a wireless communication system, the apparatus comprising:
    a transmitter for transmitting a Channel Quality Indicator CHannel (CQICH) codeword for informing of existence of pending extended real-time Polling Service (ertPS) data if at least one of a plurality of stopped ertPS connections is intended to be resumed;
    a data buffer for providing at least one ertPS Media Access Control (MAC) Protocol Data Unit (PDU) of the at least one ertPS connection; and
    a controller for providing control so that the at least one ertPS MAC PDU is transmitted when an uplink resource is allocated upon transmission of the CQICH codeword,
    wherein the uplink resource corresponds to largest one among maximum sustainable traffic rates of a plurality of ertPS connections established to the MS.

12. The apparatus of claim 11, wherein the ertPS MAC PDU comprises an extended subheader including a bitmap indicating the at least one ertPS connection to resume.

13. A method of operating a Base Station (BS) in a wireless communication system, the method comprising:
    receiving an extended subheader including a bitmap indicating at least one extended real-time Polling Service (ertPS) connection to be resumed; and
    allocating uplink resources for the at least one ertPS connection identified by the extended subheader,
    wherein respective bits constituting the bitmap indicate one of a request for resumption and a no-request for resumption of each ertPS connection, and the bits are mapped to a Service Flow Identifier (SFID) in one of an ascending and a descending order.

14. The method of claim 13, wherein the bitmap indicates one of a request for resumption and a no-request for resumption with respect to all ertPS connections established to the MS.

15. The method of claim 13, wherein the bitmap indicates one of a request for resumption and a no-request for resumption with respect to only stopped ertPS connections.

16. A method of operating a Mobile Station (MS) in a wireless communication system, the method comprising:

if at least one of a plurality of stopped extended real-time Polling Service (ertPS) connections is intended to be resumed, transmitting an ertPS Media Access Control (MAC) Protocol Data Unit (PDU) including an extended subheader including a bitmap indicating at least one ertPS connection to resume; and receiving uplink resource allocations for the at least one ertPS connection identified by the extended subheader.

17. The method of claim 16, wherein respective bits constituting the bitmap indicate one of a request for resumption and a no-request for resumption of each ertPS connection, and the bits are mapped to a Service Flow Identifier (SFID) in one of an ascending and a descending order.

18. The method of claim 17, wherein the bitmap indicates one of a request for resumption and a no-request for resumption with respect to all ertPS connections established to the MS.

19. The method of claim 17, wherein the bitmap indicates one of a request for resumption and a no-request for resumption with respect to only stopped ertPS connections.

20. A Base Station (BS) apparatus in a wireless communication system, the apparatus comprising:
a receiver for receiving an extended subheader including a bitmap indicating at least one extended real-time Polling Service (ertPS) connection to be resumed; and
a controller for allocating uplink resources for the at least one ertPS connection identified by the extended subheader,
wherein respective bits constituting the bitmap indicate one of a request for resumption and a no-request for resumption of each ertPS connection, and the bits are mapped to a Service Flow IDentifier (SFID) in one of an ascending and a descending order.

21. The apparatus of claim 20, wherein the bitmap indicates one of a request for resumption and a no-request for resumption with respect to all ertPS connections established to the MS.

22. The apparatus of claim 20, wherein the bitmap indicates one of a request for resumption and a no-request for resumption with respect to only stopped ertPS connections.

23. A Mobile Station (MS) apparatus in a wireless communication system, the apparatus comprising:
a transmitter, if at least one of a plurality of stopped extended real-time Polling Service (ertPS) connections is intended to be resumed, for transmitting an ertPS Media Access Control (MAC) Protocol Data Unit (PDU) including an extended subheader including a bitmap indicating at least one ertPS connection to resume; and
a receiver for receiving uplink resource allocations for the at least one ertPS connections identified by the extended subheader.

24. The apparatus of claim 23, wherein respective bits constituting the bitmap indicate one of a request for resumption and a no-request for resumption of each ertPS connection, and the bits are mapped to a Service Flow Identifier (SFID) in one of an ascending and a descending order.

25. The apparatus of claim 24, wherein the bitmap indicates one of a request for resumption and a no-request for resumption with respect to all ertPS connections established to the MS.

26. The apparatus of claim 24, wherein the bitmap indicates one of a request for resumption and a no-request for resumption with respect to only stopped ertPS connections.

* * * * *